Aug. 5, 1952 — C. F. HENNEY — 2,605,690
VENTILATING SYSTEM FOR VEHICLES
Filed Sept. 8, 1947 — 2 SHEETS—SHEET 2
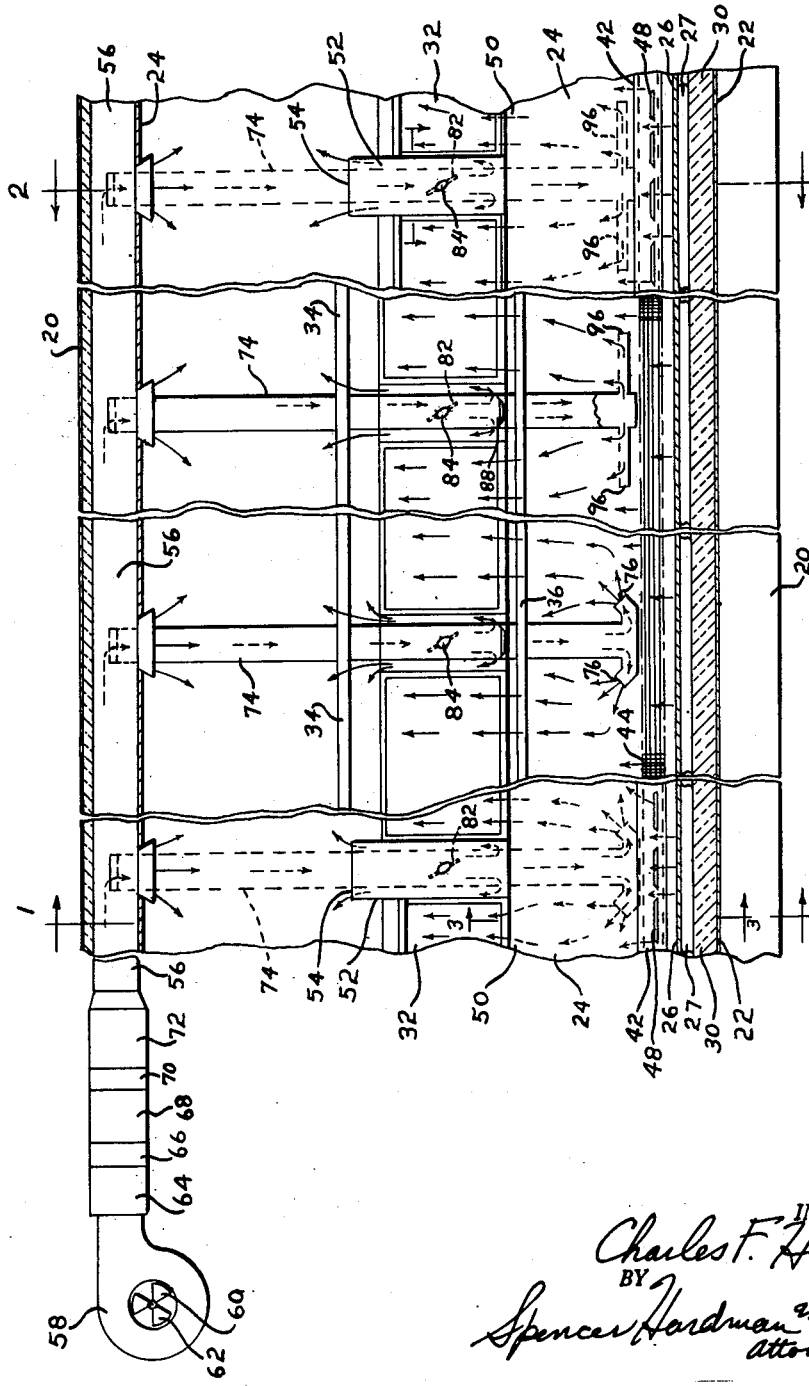
INVENTOR.
Charles F. Henney
BY Spencer Hardman and Fehr
attorneys Patented Aug. 5, 1952

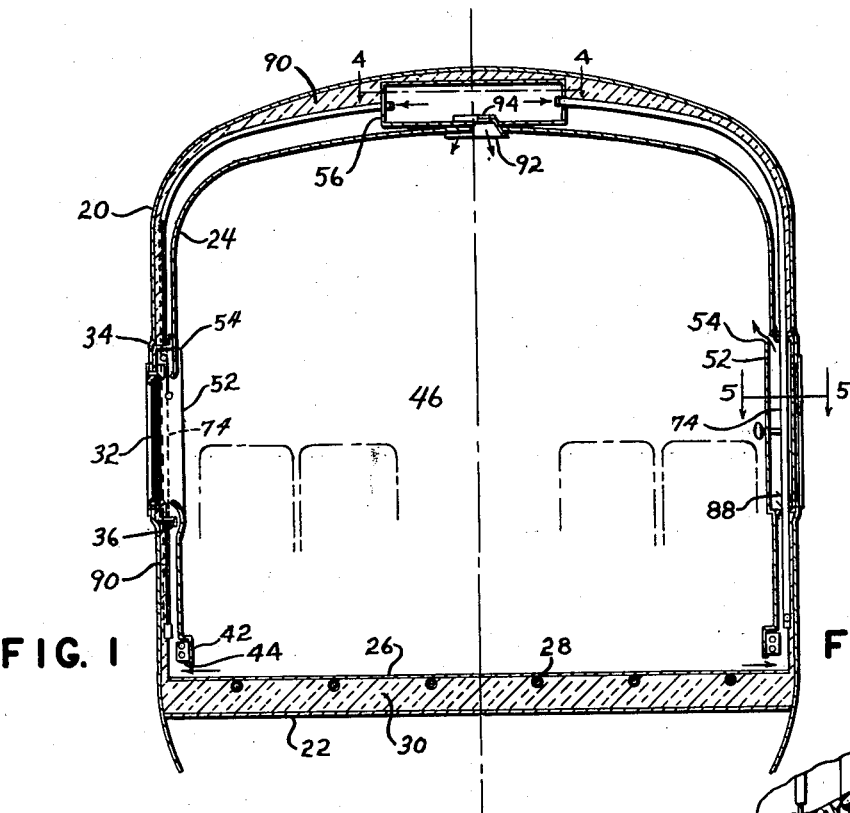

2,605,690

UNITED STATES PATENT OFFICE 2,605,690

VENTILATING SYSTEM FOR VEHICLES

Charles F. Henney, Dayton, Ohio, assignor to General Motors Corporation, Dayton, Ohio, a corporation of Delaware Application September 8, 1947, Serial No. 772,811

3 Claims. (Cl. 98—10)

This invention relates to refrigerating apparatus and more particularly to the heating and/or cooling of enclosures, especially such as are used for vehicles.

It is an object of my invention to provide a heating and/or cooling system having simple conventional heating and/or cooling elements in which radiant heat and/or cooling supplies a substantial proportion of the temperature regulation.

It is another object of my invention to modify the air circulating system of vehicles to provide a primary airflow which will induce a flow of secondary air through their hollow walls at such temperatures to provide comfortable radiant heating and/or cooling in addition to good air circulation.

It is another object of my invention to modify the air circulating system of a vehicle so as to moderately heat the walls of the vehicle above the temperature of the air in the passenger compartment during cold weather.

It is another object of my invention to modify the air circulating system of a vehicle so as to moderately cool the walls of the vehicle below the average temperature in the passenger compartment during hot weather.

It is another object of my invention to modify the air circulating system of a vehicle so that the circulating primary air discharges into and induces a flow of secondary air which dilutes and tempers the secondary air heated by the heating units which are located at the open bottom of the hollow walls of the vehicle so that the surfaces of the walls exposed to the passenger compartment are mildly heated above the average temperature in the compartment to provide comfortable radiant heating.

It is another object of my invention to modify the air circulating system of a vehicle so that cooled primary air is discharged into and induces a flow of secondary air which dilutes the circulating secondary air which flows in the hollow walls of the vehicle so that the circulating secondary air is moderately cooled and thereby the surfaces of the hollow walls are kept at a moderately cool temperature slightly below the average temperature of the air in the passenger compartment to provide comfortable radiant cooling.

These objects are attained by an enclosure having a floor and hollow walls with spaced windows. A main air duct extends substantially the length of the enclosure in the upper portion thereof within the hollow walls. This main air duct is preferably supplied with fresh air and recirculated air in proper proportions and is filtered, washed, dried and cooled or heated according to heating or cooling requirements.

Branch ducts extend from the main air duct downwardly between the windows within the hollow walls and at their lower ends have upwardly directed discharge outlets which discharge the primary air in such a way within the hollow walls to induce an upward circulation of secondary air within the hollow walls coming directly off the heating unit so as to heat the hollow walls slightly above the average temperature in the passenger compartment to provide radiant heating in a simple moderate form. An outlet opening from the hollow walls is provided at the bottom of each window so that during cold weather the passengers are protected from loss of heat through the windows.

During warm weather, the air duct system provides cold primary air to the discharge openings in the hollow walls where it induces circulation of secondary air through the hollow walls from the passenger compartment so that the hollow walls are kept at a temperature slightly below the average temperature of the passenger car to provide a simple form of radiant cooling at a moderate temperature.

Further objects and advantages of the present invention will be apparent from the following description, reference being had to the accompanying drawings, wherein a preferred form of the present invention is clearly shown.

In the drawings:

Fig. 1 is a vertical sectional view of one-half of a railway passenger car embodying one form of my invention, taken substantially along the line 1—1 of Fig. 6;

Fig. 2 is a vertical sectional view of about one-half of the railway car taken substantially along the lines 2—2 of Fig. 9;

Fig. 3 is an enlarged vertical sectional view taken substantially along the lines 3—3 of Fig. 6;

Fig. 4 is a sectional view taken substantially along the line 4—4 of Figs. 1 and 2;

Fig. 5 is an enlarged sectional view taken substantially along the line 5—5 of Fig. 2;

Fig. 6 is a fragmentary longitudinal vertical sectional view through the car shown in Fig. 1;

Fig. 7 is a sectional view similar to Fig. 6 with the greater portion of the inner walls removed;

Fig. 8 is a sectional view similar to Fig. 7 of a modified form of the invention; and Fig. 9 is a sectional view similar to Fig. 6 of this modified form of the invention.

Referring now to the drawings, and more particularly to Figs. 1 and 2, there is shown a modern passenger railway car having outer sheet metal walls 20, a sheet metal sub-floor 22 and inner walls 24, and a floor 26. If desired, directly beneath the floor 26, there may be provided heating and cooling coils 28 which may be supplied with a heating fluid during winter and a cooling fluid during the summer. However, the coils 28 may be omitted if desired. The space between the floor 26 and the sub-floor 22 is preferably filled with some suitable form of insulation 30.

Double windows 32 are provided at regular intervals throughout the length of car and are inserted in the outer walls 20. Above the windows there is provided Z-shaped structural reinforcing member 34 extending longitudinally and beneath the windows 32 there extends another Z-shaped longitudinal reinforcing member 36. Extending vertically between the windows are the Z-shaped reinforcing members 38 and 40.

The lower portion 42 of the inner walls 24 are offset inwardly and this provides a place for the finned heating coils 44 which extend longitudinally just above the floor 26 substantially throughout the passenger compartment 46 of the car. The inner walls 24 stop short of the floor 26 to provide an opening therebeneath which allows air substantially at the floor level to enter the space between the inner and outer walls 20 and 24. The offset portion 42 may be provided with louvers 48 to admit additional air to the space between the inner and outer walls. The inner wall 24 is curved around the structural reinforcing member 36 to provide a window sill 50. The portions 52 of the inner walls between the windows preferably extend outwardly a sufficient distance to be flush with the portion of the inner walls which curve around the structural reinforcing member 36. At the top of this portion 52, between the windows, there is provided an opening 54.

In the roof portion of the car between the inner and outer walls 20 and 24 there extends a main air duct 56. This main air duct is supplied with air from a blower 58 preferably having a fresh air inlet 60 on one side connecting with the air outside the car and having a recirculated air inlet upon the opposite side communicating with the passenger compartment of the car. Each of these inlets are preferably provided with rotary shutters 62 by which the proportion of an amount of fresh and recirculated air may be controlled.

The blower 58 discharges into a first duct portion 64 containing a conventional finned refrigerant evaporating unit, such as is used in air conditioning. Following this is a duct portion 66 containing a filtering device preferably of the electrostatic type. Following the filtering section there is provided a section 68 which includes an air washing device or a precipitator to further clean the air. Following this is a duct section 70 in which drying means is provided to remove water from the air and this connects directly with a section 72 which may be provided with a heating coil. It, however, is not necessary to use all of these devices if desired, since all may be omitted for heating and only the refrigerating system is absolutely necessary for cooling. The order of these devices may likewise be varied.

The section 72 discharges into the main air duct 56. The main air duct is provided with wide, thin branch ducts 74 extending between the inner and outer walls, first laterally beneath the roof portion and then downwardly in the section between the windows 32. At the lower end, each of these branch ducts is provided with two upwardly directed discharge outlets 76. The inlet of each of these branch ducts 74 is provided with an adjustable closure member or door 78 which is shaped to act as a scoop to scoop the air flowing through the main duct 56 into the branch ducts 74. These doors 78 are each provided with an individual adjusting screw 80 by which the position of each of the doors may be adjusted so as to compensate for its distance from the blower 58 so that substantially uniform pressure and flow may be obtained in each of the branch ducts 74.

In the portion of each of the branch ducts 74 between the windows, there is provided a damper 82 controlled by a handle 84 in the passenger compartment between each of the windows. Passengers, by rotating the handle 84 to turn this damper 82, may adjust the amount of air circulation in their immediate vicinity. The air which is discharged within the hollow walls from the discharge opening 76 induces a circulation of secondary air flowing from the floor level beneath the lower edge of the inner wall 24 and through the louvres 48 into heat exchange relation with the heating coil 44. This discharged air mixes with, dilutes and tempers this air heated by the heating coil 44 so that it is at a temperature moderately above the temperature of the air in the passenger compartment 46 so as to heat the inner wall 24 to a temperature which will provide a satisfactory moderate radiant heating during the winter months and yet not too hot to be objectionable.

This air within the walls, by the induced circulation and natural convection, flows upwardly and around the structural reinforcing member 36, and by the curved sill 50 at each window is directed to flow upwardly along the inner surface of each of the windows. This air may also flow upwardly between the windows behind the portion 52 of the inner walls. This is done by providing a space 86 (see Fig. 5) between the ducts 74 and the portion 52 of the inner walls 24. However, in addition to this there may be provided louvres 88 (see Figs. 2 and 8) in the portion of the duct between the windows so that some of the air will be discharged into the space 86 substantially at the level of the window sills and flow upwardly and be discharged through the opening 54. The size of the louvres and the size of the discharge outlet 76 and the heating coil 44 should be adjusted to maintain the walls at the desired temperature.

Insulation 90 is applied to the outer walls 20 and preferably located between the branch ducts 74 and the outer walls so as to prevent loss of heat from the air circulating between the walls of the car.

During the summer months, the heating coils 44 are not used. The refrigerating coil in the section 64 is used to cool the primary air supplied to the main duct 56 and the branch ducts 74. The primary air is discharged laterally upwardly from the discharge outlet 76 and induces in the hollow walls a circulation of secondary air flowing upwardly from the floor level, passing around the heating coil 44. The secondary air from the floor level mixes with, dilutes and tempers the primary air discharged from the outlet 76 so as to cool the inner walls 24 to a moderate temperature below the average temperature in the passenger compartment 46. This upwardly flowing air is discharged at the bottom of the windows so that it flows upwardly along the windows and reduces the amount of radiant heat entering the car through the windows. Some of the cooled air is discharged through the louvres 88 and passes upwardly between the portion 52 of the inner walls and the duct 74 and is discharged through the opening 54 into the passenger compartment.

If additional air circulation is desired this may be provided by controllable air outlets 92 extending directly from the main air duct through the ceiling portion of the inner wall 24. Preferably each of these is provided with rotatable shutters 94 so that it may be shut off or any desired amount of opening provided.

In Figs. 8 and 9 the branch ducts 74 are provided with modified forms of discharge outlets 96. These discharge outlets 96 are in the form of short horizontal tubes extending laterally from the lower end of the branch ducts 74 in Figs. 8 and 9. These horizontal tubes are provided with a series of perforations on their top surface through which the primary air is discharged upwardly in the form of jets so as to induce an upward circulation of the primary and secondary air regardless of whether the heating unit 44 is in operation or whether refrigerated air is supplied to the branch duct 74.

It should be understood that this system may be used in cars and other vehicles having several compartments and/or roomettes since the circulation may be individually controlled through the adjustment of the doors 78, the dampers 82 and the rotatable shutters 94 so that each compartment may be cooled, heated and ventilated as desired. The heating coils 44 are standard equipment and the elements provided in the duct sections 64 to 72 inclusive may also be of standard commercial construction and size. They may be obtained, installed and replaced with a minimum of difficulty. Thus through this duct and air distribution system, panel or radiant heating and cooling may be obtained without the use of special coils or special heating and cooling units.

While the form of embodiment of the invention as herein disclosed, constitutes a preferred form, it is to be understood that other forms might be adopted, as may come within the scope of the claims which follow.

What is claimed is as follows:

1. An enclosure having a floor and a wall structure incorporating spaced inner and outer side walls, a plurality of windows located in spaced relation in the wall structure, said inner walls being constructed to provide openings adjacent the floor and immediately beneath the windows and at a level substantially even with the top of the windows, said inner walls being substantially imperforate between said openings adjacent the floor and said openings immediately beneath the windows, a main air duct means extending above the windows, branch air duct means extending from the main air duct means downwardly between the windows and between the inner and outer walls and having upwardly directed discharge outlets above the opening adjacent the floor for discharging air upwardly between the walls, said branch supply duct means being provided with an additional discharge outlet between the windows between the inner and outer walls.

2. An enclosure having a floor and a wall structure incorporating spaced inner and outer side walls, a plurality of windows located in spaced relation in the wall structure, said inner walls being constructed to provide openings adjacent the floor and immediately beneath the windows and at a level substantially even with the top of the windows, a main air duct means extending above the windows, branch air duct means extending from the main air duct means downwardly between the windows and between the inner and outer walls and having upwardly directed discharge outlets above the opening adjacent the floor for discharging air upwardly between the walls, each of said branch air ducts having lateral extensions on opposite sides thereof, each extension being provided with an upwardly directed discharge opening for inducing an upward flow of air between the inner and outer walls beneath each of said windows and providing an upward flow of air from said openings beneath the windows over the inner surface of the windows.

3. An enclosure having a floor and a wall structure incorporating spaced inner and outer side walls, a plurality of windows located in spaced relation in the wall structure, said inner walls being constructed to provide openings adjacent the floor and immediately beneath the windows and at a level substantially even with the top of the windows, a main air duct means extending above the windows, branch air duct means extending from the main air duct means downwardly between the windows and between the inner and outer walls and having upwardly directed discharge outlets above the opening adjacent the floor for discharging air upwardly between the walls, each of said branch air ducts having lateral extensions on opposite sides thereof, each extension being provided with an upwardly directed discharge opening for inducing an upward flow of air between the inner and outer walls beneath each of said windows and providing an upward flow of air from said openings beneath the windows over the inner surface of the windows, said branch ducts each having an additional opening between the windows at a level immediately above the lower edge of the windows.

CHARLES F. HENNEY.

REFERENCES CITED

The following references are of record in the file of this patent:

UNITED STATES PATENTS

| Number | Name | Date |
|---|---|---|
| 1,303,210 | Klein | May 6, 1919 |
| 1,853,459 | Russell et al. | Apr. 12, 1932 |
| 1,878,012 | Stacey, Jr., et al. | Sept. 20, 1932 |
| 1,884,408 | Van Vulpen et al. | Oct. 25, 1932 |
| 1,995,667 | Cano | Mar. 26, 1935 |